Patented July 11, 1944

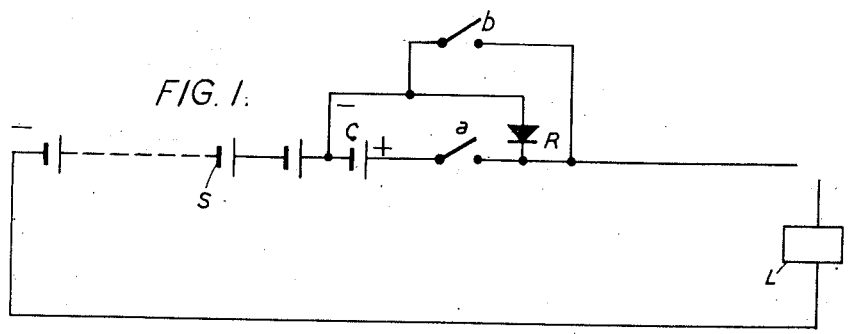
FIG. 1.
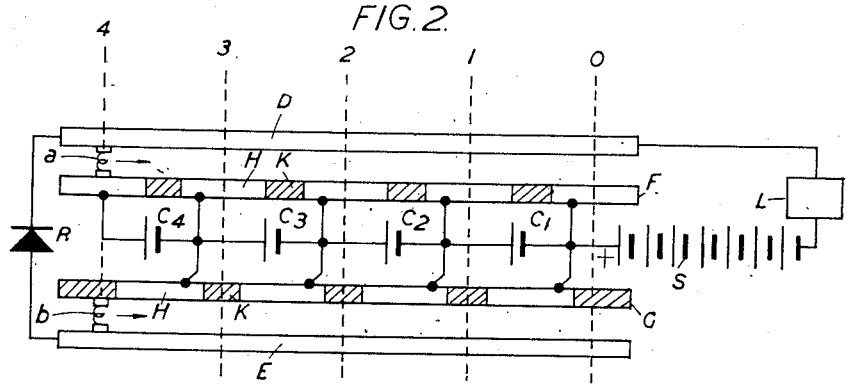
FIG. 2.
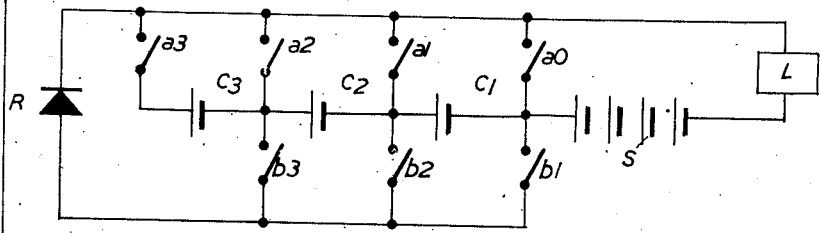
FIG. 3.
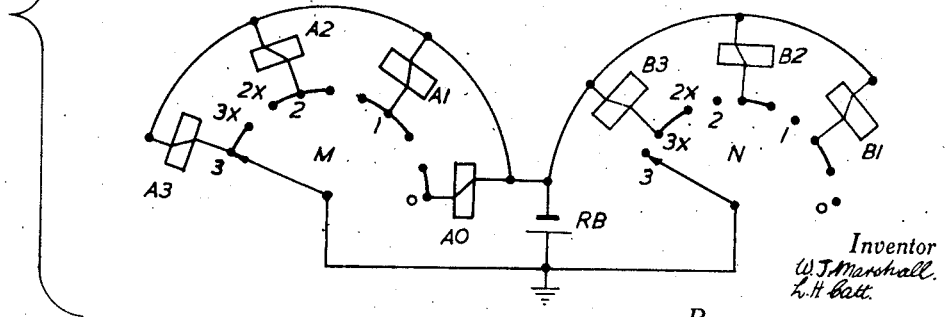

2,353,410

UNITED STATES PATENT OFFICE 2,353,410

SWITCHING ARRANGEMENT FOR EMPLOYING RECTIFIERS IN CONJUNCTION WITH BATTERY REGULATING SWITCHES

William James Marshall, Harrow, and Leslie Herbert Catt, Wembley, England

Application December 3, 1942, Serial No. 467,744
In Great Britain December 4, 1941

6 Claims. (Cl. 320—18)

The present invention relates to switching arrangements for unidirectional electric power sources, and in particular to means for adding or removing units or groups of units of such power sources.

It is common practice to supply a load with electric current from a unidirectional source such as a battery of cells, or a rectifier arrangement, and to change from time to time the number of cells or rectifier units or sections which are connected to the load, generally for the purpose of adjustment of the applied voltage.

In particular, for example, it frequently happens that a telephone exchange is supplied with power from an accumulator battery whose voltage must be maintained within certain predetermined limits, and for this purpose a switching arrangement is often provided for adding cells or groups of cells to the battery as the discharge proceeds, or for removing them, as occasion arises.

In such cases it is generally necessary that the switching arrangement shall meet two conditions:

(a) The current supplied to the load must not be interrupted; and (b) There shall not be any excessive currents taken from the cells or sections at any time during the switching.

The first condition requires a make-before-break switching operation, and this will generally tend to short-circuit the cell or cells being switched unless means for preventing this is provided. Hitherto the usual practice has been to insert a resistance in series with the cell during the switching, which resistance is subsequently short circuited, or otherwise removed.

Although for clearness the invention will be described in its application to battery switching, it will be understood that it applies equally to any other types of unidirectional source such as sources involving direct current generators or rectifying arrangements.

According to the present invention the above mentioned conditions are met by providing an arrangement for switching in or out of circuit, sections of a unidirectional source supplying electric current to a load, comprising a rectifier adapted to maintain the current uninterrupted during the switching operation and to prevent excessive currents from flowing through the switch contacts.

The invention will be described with reference to the accompanying drawing in which:

Fig. 1 shows a schematic circuit diagram illustrating the principles of the invention;

Fig. 2 shows a diagram of an embodiment employing a mechanical switch; and

Fig. 3 shows a diagram of another embodiment employing electrical switching.

Referring to Fig. 1, S represents a multi-cell battery which supplies current to a load L. C is an extra cell which is to be added to, or removed from, the battery in order to adjust the voltage applied to the load, it being required that the current shall not be interrupted during the process of switching.

Two separately controllable switches $a$ and $b$ are provided, $a$ being in series with the cell C. A rectifier R of any suitable type is bridged across C and $a$, and is shunted by the short-circuiting switch $b$.

In operation the switches are actually never both closed at the same time. Suppose that $b$ is closed, so that S supplies current to the load without the extra cell C. If it should be desired to add the extra cell, the switch $b$ is first opened, so that the rectifier R is inserted in series with the load. The current however will pass through it in the forward direction and it will accordingly have a low resistance. Switch $a$ is now closed, connecting the cell C in parallel with R. It will be observed, however, that the potential applied by C to R is in the backward direction so that R will immediately assume a high resistance. The load current accordingly now passes through the extra cell C, only a negligible current flowing through R. By other switches not shown in Fig. 1, R may be disconnected and transferred for use in the same way with other extra cells (not shown).

It will be seen that directly the extra cell is connected in circuit it causes the rectifier to assume a very high resistance so that only an insignificant current can be passed through it when switch $a$ is closed and $b$ is open. By avoiding a momentary heavy discharge of the cell while switching, the arrangement removes the necessity for the heavy contacts which would otherwise have to be provided to carry the large discharge currents, since the current can never at any time exceed the normal load current by more than an inappreciable amount.

By choosing the forward resistance of the rectifier so that it is small compared with that of the load, the changes in the load current during the switching operation can easily be made negligible.

In practical arrangements such as those which will now be described, the successive addition or removal of several extra cells such as C will be provided for, and the circuits are such that the rectifier is always disconnected after any switching operation is completed.

Fig. 2 shows in diagrammatic form mechanical switch arrangement adapted for adding or removing any number of extra cells, of which four are shown, $C_1$ to $C_4$. Two contact bars or rings, or the like, D and E, are provided, with corresponding bars F and G having alternately conducting and insulating sections H and K arranged opposite thereto.

A contact brush $a$ or the like connects the bars D and F and another similar brush $b$ connects E and G. The two brushes $a$ and $b$ are moved simultaneously along the bars by a suitable mechanical arrangement.

The conducting and insulating sections of the bars F and G are staggered so that when $a$ is centrally on an insulating section, $b$ is centrally on a conducting section and vice versa, but the conducting sections are longer than the insulating sections so that the brushes $a$ and $b$ can both be simultaneously in contact with conducting sections in positions intermediate between the insulating sections. The bar D is connected to one terminal of the load, and the rectifier R is connected in series between the two bars D and E.

The connections of the extra cells $C_1$ to $C_4$ to the bars F and G will be easily understood from Fig. 2. The positions numbered 0 to 4 represent the final stopping positions of the brushes when zero to four, respectively, extra cells are in circuit.

When the brushes are at position 4, as shown, four extra cells are in circuit. If now the brushes are moved in the direction of the arrows the following sequence of operations occurs:

*Table*

A. (Position 4). Load connected through $a$ to $C_4$; R disconnected.
B. R bridged across $C_4$ through $b$.
C. $C_4$ disconnected, load connected to $C_3$ through R and $b$.
D. Load connected direct to $C_3$ through $a$; R bridged across $C_3$ through $b$.
E. (Position 3). Load connected through $a$ to $C_3$; R disconnected.

It will be evident that the same sequence of operations will be followed for each of the other cells in turn as the brushes are moved to the right, and that the operations will take place in the reverse order as the cells are added when the brushes are moved to the left.

The bars D, E, F and G can obviously be mechanically represented in a number of different forms. Straight bars, or contacts in line substantially as indicated in Fig. 2 can be used, the brushes $a$ and $b$ being mounted on a carriage driven by a rotating screw turned by hand, or power driven. A slip ring system with fixed brushes could alternatively be used, or contacts arranged in a circle with an ordinary rotating switch. Any other arrangement which carries out the same operations as indicated in the figure would be suitable.

An alternative switching means using relays is shown in Fig. 3, adapted for three extra cells $C_1$, $C_2$ and $C_3$, though the same method can obviously be extended to any number of cells. Four relays A0 to A3 are used for connecting the load (corresponding to the bars D and F in Fig. 2) and three relays B1 to B3 for connecting the rectifier R (corresponding to the bars E and G).

Two mechanically coupled ten-point switches M and N are employed for energising the relays from a source RB (which may be the same as the source S). The steps 0, 1, 2, and 3 are the rest positions, corresponding, respectively, to zero to three extra cells.

Fig. 3 is drawn on the detached contact principle, and the contact of any relay, say A1 is denoted $a1$, and so on for the others. All contacts are shown as for the unoperated condition of the corresponding relay.

When the switches M and N are in the position 3 as shown, $a^3$ is closed and $b^3$ is open the condition being as A in the table above. When the switches are moved to position $3x$, $b^3$ is closed producing condition B. When the switches are moved to position $2x$, $a^3$ opens and $a^2$ closes, $b^3$ remaining closed producing condition D. When they are finally moved to position 2, $b^3$ opens and condition E is produced, the cell $C_3$ being cut out. The remaining cells are switched in a similar way.

The switches M and N, which have only to carry the relay operating currents, do not need to be designed for heavy duty, but the relay contacts of course have to be designed suitably for the load current but do not have to deal with any large short-circuit currents during the switching.

The rectifier R may be a diode, or bank of diodes, or it may be any kind of dry rectifier or group of dry rectifiers, in series and/or parallel combinations according to the requirements which have to be met. In this specification the term "rectifier" signifies any of these types or group of such types.

It will be evident also that the cells C may each represent groups of any number of cells or other unidirectional sources not necessarily batteries.

It will also be obvious that cells may be added to the negative end of the battery instead of to the positive end by similar arrangements, so long as the rectifier is poled to present the forward impedance to the load current and the backward impedance to the added cell.

What is claimed is:

1. In a switching arrangement including an electrical circuit comprising a load and a unidirectional current source formed of sections adapted to be switched in or out of circuit, a rectifier, means for shunting a selected section by the rectifier and means for disconnecting said section so that the load current flows through the rectifier in the forward direction, said rectifier being poled in the backward direction with respect to said section to be disconnected.

2. In a switching arrangement including an electrical circuit comprising a load and a unidirectional current source formed of sections adapted to be switched in or out of circuit, a rectifier, means for shunting a selected section by the rectifier, means for disconnecting said section so that the load current flows through the rectifier in the forward direction, said rectifier being poled in the backward direction with respect to said section to be disconnected, and means operable to short circuit said rectifier, connect the load direct to said source and disconnect the rectifier.

3. In a switching arrangement including an electrical circuit comprising a load and a unidirectional current source formed of sections adapted to be switched in and out of circuit, a rectifier, means for connecting said rectifier in series with the load whereby the current flows through the rectifier in forward direction, and means operable to connect a selected section of the source across said rectifier and subsequently disconnect the rectifier said rectifier being poled in the backward direction with respect to said selected section.

4. In a switching arrangement including an electrical circuit comprising a load and a unidirectional current source formed of sections adapted to be switched in and out of circuit, a first pair of bars each having conducting and insulating areas, the sections of said current source connected to the conducting areas of said bars, a second pair of contact bars related to said first pair of bars, a rectifier connected in series between said second pair of bars, and brushes movable simultaneously along said bars to permit the switching in or out of circuit of a selected section, said rectifier being poled in the backward direction with respect to said selected section.

5. In a switching arrangement including an electrical circuit comprising a load and a unidirectional current source formed of sections adapted to be switched in and out of circuit, a first pair of opposed bars each having conducting and insulating areas, the conducting areas on each bar being longer than the insulating areas thereon and the conducting and insulating areas on the opposed bars being staggered, a second pair of contact bars related to said first pair of bars, a rectifier connected in series between said second pair of bars, and brushes movable simultaneously along and between one bar of each of the first pair of bars and one bar of each of the second pair of bars to permit a selected section of said source to be switched in and out of circuit, said rectifier being poled in the backward direction with respect to said selected section.

6. In a switching arrangement including an electrical circuit comprising a load and a unidirectional current source formed of sections adapted to be switched in and out of circuit, a rectifier connected in series with said load, a group of relays having contacts for connecting a selected section to the load, a second group of relays having contacts for connecting said rectifier to the selected section, said rectifier being poled in the backward direction with respect to said selected section and a switch for controlling the relays.

WILLIAM JAMES MARSHALL.
LESLIE HERBERT CATT.